(12) United States Patent
Newcombe et al.

(10) Patent No.: US 11,816,886 B1
(45) Date of Patent: Nov. 14, 2023

(54) APPARATUS, SYSTEM, AND METHOD FOR MACHINE PERCEPTION

(71) Applicant: META PLATFORMS TECHNOLOGIES, LLC, Menlo Park, CA (US)

(72) Inventors: Richard Andrew Newcombe, Seattle, WA (US); Renzo De Nardi, Seattle, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 514 days.

(21) Appl. No.: 16/021,900

(22) Filed: Jun. 28, 2018

(51) Int. Cl.
| | |
|---|---|
| G06K 9/00 | (2022.01) |
| G06V 20/20 | (2022.01) |
| G01S 3/803 | (2006.01) |
| G06V 10/70 | (2022.01) |
| G06V 40/10 | (2022.01) |
| H04R 1/10 | (2006.01) |
| G06T 7/70 | (2017.01) |
| G06F 3/16 | (2006.01) |

(52) U.S. Cl.
CPC ............ *G06V 20/20* (2022.01); *G01S 3/8034* (2013.01); *G06V 10/768* (2022.01); *G06V 40/10* (2022.01); *G06F 3/16* (2013.01); *G06T 7/70* (2017.01); *H04R 1/1008* (2013.01)

(58) Field of Classification Search
None
See application file for complete search history.

(56) References Cited

U.S. PATENT DOCUMENTS

| | | | | |
|---|---|---|---|---|
| 9,380,379 | B1* | 6/2016 | Fitch et al. | H04R 1/14 |
| 9,872,113 | B2* | 1/2018 | Inagaki | H04R 25/30 |
| 10,726,861 | B2* | 7/2020 | Flaks et al. | G10L 21/028 |
| 11,310,211 | B2* | 4/2022 | Schneider et al. | H04L 61/20 |
| 2006/0075422 | A1* | 4/2006 | Choi et al. | G01S 3/7864 725/18 |
| 2013/0174213 | A1* | 7/2013 | Liu et al. | G06T 19/006 726/1 |
| 2013/0278631 | A1* | 10/2013 | Border et al. | G06Q 30/02 345/633 |

(Continued)

FOREIGN PATENT DOCUMENTS

| | | | |
|---|---|---|---|
| JP | 2006-407871 | * | 6/2006 |
| JP | 2006148295 A | | 6/2006 |

OTHER PUBLICATIONS

Experiencing Guidance in 3D Spaces with a Vibrotactile Head-Mounted Display. Oliveira et al. (Year: 2017).*

(Continued)

*Primary Examiner* — Delomia L Gilliard
(74) *Attorney, Agent, or Firm* — Greenberg Traurig, LLP (57) ABSTRACT

A system may include a wearable apparatus dimensioned to be worn by a user about an axial region of the user's body such that, when the wearable apparatus is worn by the user, the user's field of view into a local environment is substantially free of a view of the wearable apparatus. The system may also include a machine-perception subsystem that is coupled to the wearable apparatus and that gathers information about the local environment by observing the local environment. Additionally, the system may include an experience-analysis subsystem that infers, based on the information about the local environment and information about the user, contextual information about an experience of the user in the local environment. Furthermore, the system may include a non-visual communication subsystem that outputs the contextual information about the experience of the user. Various other apparatuses, systems, and methods are also disclosed.

20 Claims, 8 Drawing Sheets

(56) References Cited

U.S. PATENT DOCUMENTS

| | | | | |
|---|---|---|---|---|
| 2013/0329918 | A1* | 12/2013 | Kubba | H04R 1/105 381/151 |
| 2014/0112503 | A1* | 4/2014 | Hebenstreit | H04R 1/00 381/151 |
| 2014/0282144 | A1* | 9/2014 | Maciocci | H04N 13/344 715/765 |
| 2014/0337023 | A1* | 11/2014 | McCulloch et al. | G06F 1/163 704/235 |
| 2015/0016777 | A1* | 1/2015 | Abovitz et al. | G06F 3/0482 385/37 |
| 2015/0231509 | A1* | 8/2015 | McMain, II et al. | A63F 13/55 463/31 |
| 2016/0027212 | A1* | 1/2016 | Da Veiga et al. | G06F 3/011 345/633 |
| 2016/0178905 | A1* | 6/2016 | Rider et al. | G06F 3/02 345/8 |
| 2016/0212272 | A1* | 7/2016 | Srinivasan et al. | H04N 21/439 |
| 2017/0192401 | A1* | 7/2017 | Wexler et al. | G06K 9/6267 |
| 2017/0249863 | A1* | 8/2017 | Murgia et al. | H04N 13/239 |
| 2017/0337742 | A1* | 11/2017 | Powderly et al. | G06F 3/04815 |
| 2018/0075659 | A1* | 3/2018 | Browy et al. | G06K 9/78 |
| 2018/0176680 | A1* | 6/2018 | Knight et al. | H04R 1/406 |
| 2018/0189568 | A1* | 7/2018 | Powderly et al. | G06K 9/00604 |
| 2018/0249048 | A1* | 8/2018 | Fiebelkorn et al. | G02B 27/0176 |
| 2019/0028803 | A1* | 1/2019 | Benattar | H04S 7/304 |
| 2019/0273990 | A1* | 9/2019 | Sahota et al. | H04R 5/0335 |
| 2019/0379644 | A1* | 12/2019 | Schneider et al. | G16H 40/67 |
| 2019/0387352 | A1* | 12/2019 | Jot et al. | H04R 3/04 |
| 2021/0014607 | A1* | 1/2021 | Cohen et al. | H04R 1/46 |
| 2022/0120607 | A1* | 4/2022 | Kojima | G01H 9/004 |

OTHER PUBLICATIONS

International Preliminary Report on Patentability for International Application No. PCT/IB2019/056866, mailed Jan. 7, 2021, 11 Pages.

International Search Report and Written Opinion for International Application No. PCT/IB2019/056866, mailed Feb. 12, 2020, 15 Pages.

Vibrotactile Jacket for Perception Enhancement. Cardin et al. (Year: 2008).*

* cited by examiner

APPARATUS, SYSTEM, AND METHOD FOR MACHINE PERCEPTION

BACKGROUND

Virtual reality and augmented reality systems have risen as a way to present digital content to users in an immersive environment. For example, users may use virtual reality goggles to experience a remote location without ever leaving their homes. Augmented reality systems may also provide a user with digital content that merges with the actual environment around the user. These types of technologies may help to enhance a user's experiences by increasing and streamlining the information that the user can process.

However, in many instances, traditional systems may not be able to fully or accurately capture a user's environment, which may reduce the quality of feedback that the systems can provide the user. Additionally, systems that attempt to capture the environment may be bulky or otherwise too heavy to comfortably use for an extended period of time. Such systems may be too complex ortoo large to be portably used. Furthermore, virtual or augmented reality devices may hinder a user's experience with the actual environment. For example, many devices incorporate a large visual display that covers or blocks some or all of a user's field of view, obstructing the user from seeing important objects or other people. Other devices may incorporate audio systems that inhibit the user's ability to hear surrounding sounds. Users may then have difficulty maintaining interactions with their surroundings while wearing such devices. Therefore, more effective, efficient, or otherwise improved methods and systems of delivering augmented reality to users are needed.

SUMMARY

As will be described in greater detail below, the instant disclosure describes various apparatuses, systems, and methods for improving machine perception in augmented reality systems by capturing a user's environment while reducing digital interference from visual and audio feedback in a portable form factor. In one example, a system may include a wearable apparatus dimensioned to be worn by a user about an axial region of the user's body such that, when the wearable apparatus is worn by the user, the user's field of view into a local environment is substantially free of a view of the wearable apparatus. In this example, the system may also include a machine-perception subsystem that is coupled to the wearable apparatus and that gathers information about the local environment by observing the local environment. Additionally, the system may include an experience-analysis subsystem that infers, based on the information about the local environment and information about the user, contextual information about an experience of the user in the local environment. Finally, the system may include a non-visual communication subsystem that outputs the contextual information about the experience of the user.

In some embodiments, the machine-perception subsystem may include an audio localization subsystem that has two or more input transducers attached to the wearable apparatus and configured to enable directional detection of a sound within the local environment. Additionally, the audio localization subsystem may have a processor programmed to compare output signals received from the two or more input transducers to identify a direction from which the sound in the local environment is received.

In some examples, the non-visual communication subsystem may include an output transducer configured to generate sound waves that communicate the contextual information to the user. In these examples, the output transducer may be positionable against a tragus of a user's ear to mechanically vibrate the tragus to produce one or more sound waves that travel down an ear canal of the user's ear toward an eardrum.

In one embodiment, (1) the machine-perception subsystem may include an image camera that captures visible-spectrum light from the local environment, (2) the experience-analysis subsystem may include a localization device for determining a location of the wearable apparatus, and (3) the information about the user may include the location of the wearable apparatus. In this embodiment, the localization device may include a localization camera that captures image data for determining a relative position of the wearable apparatus within the local environment and/or a localization sensor that determines a geographic location of the wearable apparatus.

In some examples, the machine-perception subsystem may include a depth detection sensor configured to detect relative depths of surfaces within the local environment.

In some embodiments, the non-visual communication subsystem may include a network interface that sends the contextual information to a remote computing device.

In one example, the information about the user may include information indicative of an interest of the user, and the experience-analysis subsystem may infer the contextual information about the experience of the user by identifying, within the local environment, an object associated with the interest of the user. In this example, the information indicative of the interest of the user may include information maintained within a social media account of the user.

In one embodiment, the information about the user may include information about a previous interaction between the user and an entity. In this embodiment, the experience-analysis subsystem may infer the contextual information about the experience of the user by determining, based on the information about the local environment, that the user is currently interacting with the entity and by using the information about the previous interaction between the user and the entity to identify information about the entity to provide to the user.

In some examples, the experience-analysis subsystem may include a biometric sensor that outputs biometric data about the user, and the information about the user may include the biometric data. In these examples, the experience-analysis subsystem may infer the contextual information about the user by correlating an object in the local environment with the biometric data about the user.

In some embodiments, the experience-analysis subsystem may correlate environmental information detected by the machine-perception subsystem with inferred experiences of the user and may track, over a period of time, correlations between the environmental information and the inferred experiences of the user. In these embodiments, the information about the user may include the correlations between the environmental information and the inferred experiences of the user.

In some examples, the wearable apparatus may include a housing dimensioned to be worn around a head of the user. Additionally or alternatively, the wearable apparatus may include a housing dimensioned to be worn around a neck of the user.

In one example, the experience-analysis subsystem may include an inertial-measurement unit. In this example, the information about the user may include movement of the user detected by the inertial-measurement unit.

According to various embodiments, a corresponding method may include receiving information about a local environment from a machine-perception subsystem that gathers the information about the local environment by observing the local environment and that is coupled to a wearable apparatus dimensioned to be worn by a user about an axial region of the user's body such that, when the wearable apparatus is worn by the user, the user's field of view into the local environment is substantially free of a view of the wearable apparatus. The method may also include identifying information about the user. Additionally, the method may include inferring, based on the information about the local environment and information about the user, contextual information about an experience of the user in the local environment. Furthermore, the method may include outputting the contextual information about the experience of the user.

In some examples, receiving information about the local environment may include mapping the local environment.

In one embodiment, identifying information about the user may include receiving, from an additional wearable apparatus, information detected by the additional wearable apparatus.

In one example, inferring contextual information about the experience of the user may include predicting a future experience of the user.

In addition to the various systems and methods described herein, the instant disclosure presents exemplary apparatuses for improving machine perception in augmented reality systems. For example, a corresponding head-worn apparatus may include a housing dimensioned to be worn about a head of a user such that, when the head-worn apparatus is worn by the user, the user's field of view into a local environment is substantially free of a view of the head-worn apparatus. Additionally, the head-worn apparatus may include a machine-perception subsystem that is coupled to the housing and that gathers information about the local environment by observing the local environment. The head-worn apparatus may also include an experience-analysis subsystem that is coupled to the housing and that infers, based on the information about the local environment and information about the user, contextual information about an experience of the user in the local environment. Finally, the head-worn apparatus may include a non-visual communication subsystem that is coupled to the housing and that outputs the contextual information about the experience of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for improving machine perception in augmented reality systems. As will be explained in greater detail below, embodiments of the instant disclosure may, by capturing visual and audio information about a local environment, provide a user with enhanced feedback and information pertinent to interactions with the environment. For example, by recognizing a nearby person speaking to the user, the disclosed embodiments may remind the user of the other person's name and previous interactions, thereby enhancing social interactions through detecting other individuals. In another example, the disclosed systems may detect a physical location of the user to constantly update information about new locations that can improve an artificial intelligence assistant to provide the user with relevant contextual information in the form of audio messages. Additionally, by enclosing a machine-perception subsystem within a wearable device, the disclosed embodiments may enable the user to wear the wearable device for an extended time to increase the accuracy and usefulness of machine perception. For example, a battery-powered, wearable device may enable extended use of the disclosed systems in a way that improves machine learning and artificial intelligence through gathering more data about the user's environment. Furthermore, the disclosed systems may utilize information about the user and the local environment, as well as historical data, to predict a future interaction and/or improve feedback to the user.

The following will provide, with reference to FIGS. 1-5, detailed descriptions of systems and wearable apparatuses for enhancing machine perception for augmented reality. In addition, the discussion associated with FIG. 6 will provide an example of a user using the described systems to interact with a local environment. The discussion associated with FIG. 7 will provide an example of information used in the disclosed systems. Furthermore, detailed descriptions of methods for improving machine perception in augmented reality systems will be provided in connection with FIG. 8. As used herein, the term "machine perception" generally refers to a method for detecting and interpreting environmental variables to understand and/or respond to the environment.

Figure 1:
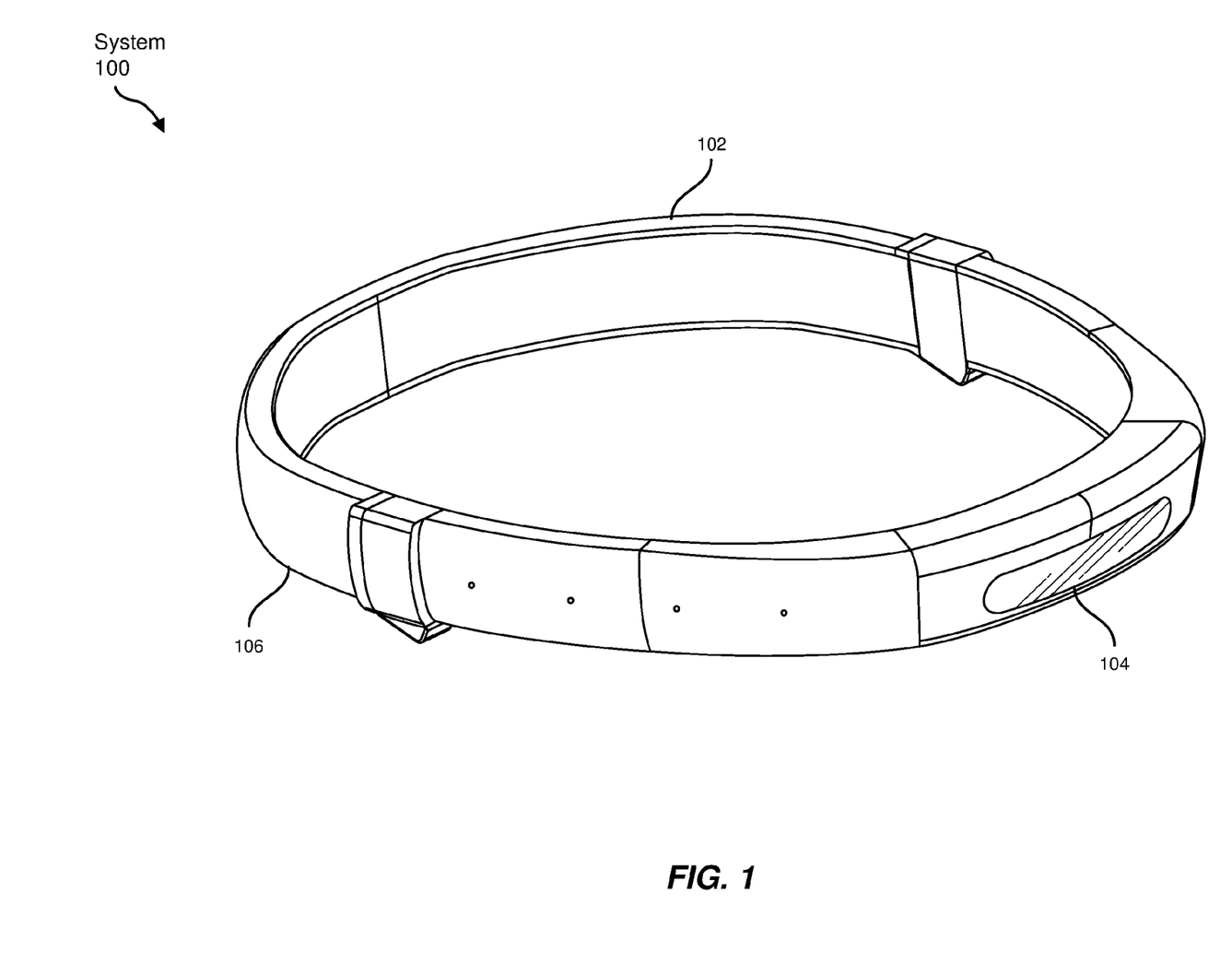
FIG. 1 is a perspective view of an exemplary augmented reality system according to some embodiments.

FIG. 1 illustrates a perspective view of an exemplary augmented reality system 100. As shown in FIG. 1, system 100 may include a wearable apparatus 102 and a machine-perception subsystem 104 that is coupled to wearable apparatus 102 and that gathers information about a local environment by observing the local environment. Wearable apparatus 102 may represent a head-worn apparatus and may further include a housing 106 that holds machine-perception subsystem 104. In some examples, machine-perception subsystem 104 may fit a range of users, such as by adjustably accommodating various head shapes, head sizes, hairstyles, and/or eyewear. Additionally, wearable apparatus 102 may be dimensioned to remain within a set weight limit and/or maintain predetermined weight distributions to provide comfort for long periods of wear. Furthermore, wearable apparatus 102 may include additional features to improve comfort and fit for various users.

Figure 2:
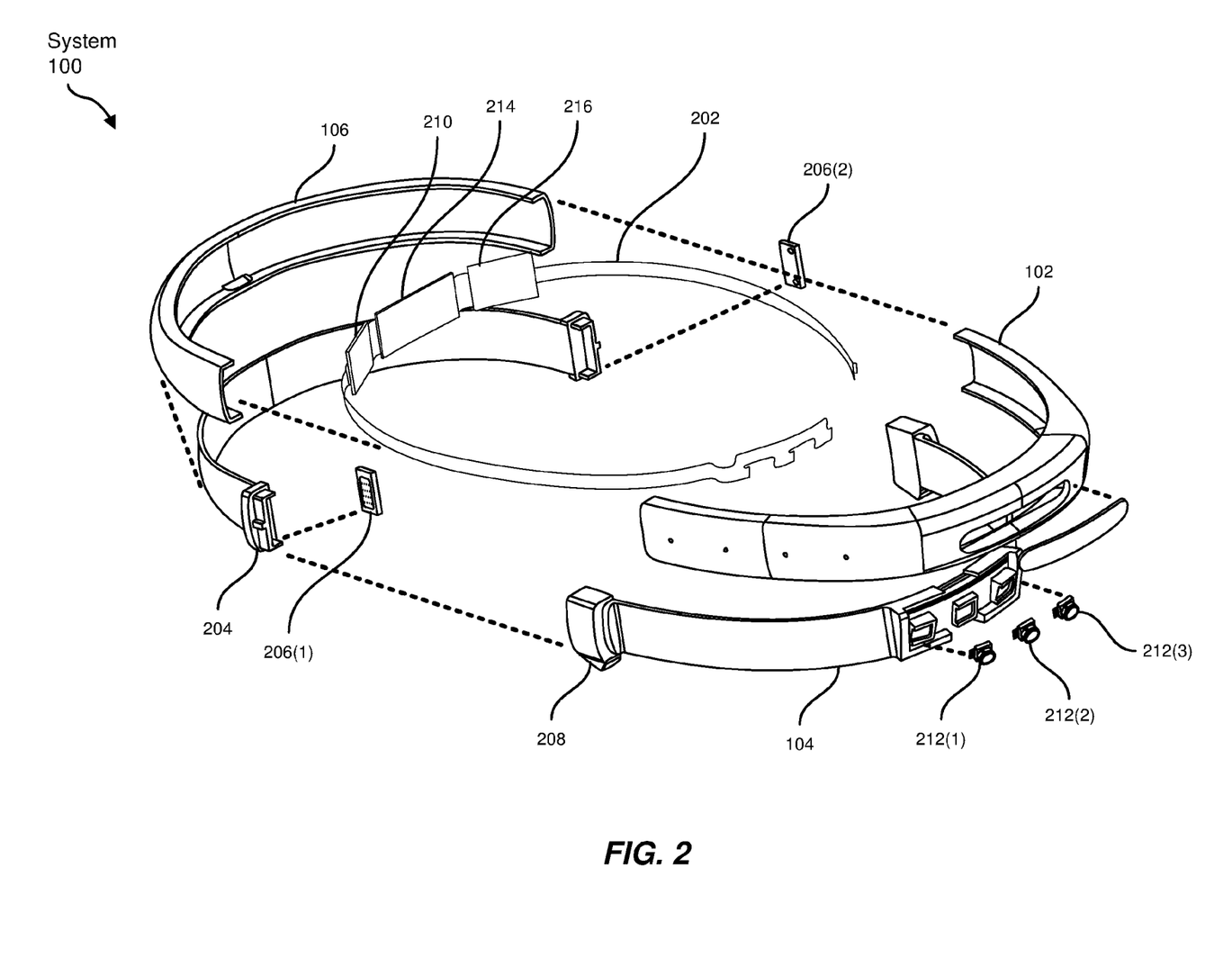
FIG. 2 is an exploded view of the exemplary augmented reality system according to some embodiments.

FIG. 2 illustrates an exploded view of exemplary augmented reality system 100. As shown in FIG. 2, system 100 of FIG. 1 may additionally include an experience-analysis subsystem 202 that infers, based on the information about the local environment and information about a user, contextual information about an experience of the user in the local environment. Although illustrated as a part of wearable apparatus 102 in FIG. 2, experience-analysis subsystem 202 may additionally or alternatively represent a separate device and/or a virtual cloud system networked with wearable apparatus 102.

In some embodiments, as illustrated in FIG. 2, machine-perception subsystem 104 may include an audio localization subsystem 204 that may include input transducers 206(1) and 206(2) attached to wearable apparatus 102 and configured to enable directional detection of a sound within the local environment. Audio localization subsystem 204 may also include a processor 208 programmed to compare output signals received from input transducers 206(1) and 206(2) to identify a direction from which the sound in the local environment is received.

As used herein, the term "transducer" generally refers to a device that converts one form of energy to another. Examples of sound transducers may include, without limitation, voice coils, dynamic coils, piezoelectric transducers, microphones, variations or combinations of one or more of the same, and/or any other type of transducer that converts a signal to a sound and/or vice versa. Specifically, input transducers 206(1) and/or 206(2) may convert a sound wave to an electrical signal sent to processor 208.

The term "processor," as used herein, generally refers to any type or form of hardware-implemented processing unit capable of interpreting and/or executing computer-readable instructions. Examples of processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

In the above embodiments, audio localization subsystem 204 may use beamforming to detect the direction of the sound. The term "beamforming," as used herein, generally refers to a process of filtering signals such as sound waves to detect spatial information. For example, input transducers 206(1) and 206(2) may represent an array of microphones that use beamforming to detect a specific conversation in one particular direction among multiple conversations in a noisy environment.

In some examples, machine-perception subsystem 104 may include an image camera that captures visible-spectrum light from the local environment. For example, machine-perception subsystem 104 may represent a computer vision system that utilizes photographic and/or x-ray cameras to recognize elements in the local environment. Additionally, experience-analysis subsystem 202 may include a localization device 210 for determining a location of wearable apparatus 102. In these examples, localization device 210 may include one or more localization cameras that capture image data for determining a relative position of wearable apparatus 102 within the local environment. For example, localization device 210 may be part of a simultaneous localization and mapping (SLAM) system of system 100 to identify and/or map features of the local environment and/or to identify a location, orientation, and/or movement of wearable apparatus 102 and/or other objects in the local environment.

Additionally or alternatively, localization device 210 may include a localization sensor that determines a geographic location of wearable apparatus 102. In these examples, localization device 210 may represent a fiber optic gyroscope (FOG) or an inertial-measurement unit (IMU) that detects an orientation and/or a movement of wearable apparatus 102. Additionally or alternatively, localization device 210 may represent a Global Positioning System (GPS) antenna and/or any other suitable sensor for detecting location and orientation. Furthermore, localization device 210 may combine one or more localization cameras and localization sensors to determine the relative location of wearable apparatus 102 to objects within the local environment and compare the location with absolute and/or global location data to detect a discrepancy that indicates a change in position and/or movement of an object.

In one embodiment, machine-perception subsystem 104 may include depth detection sensors 212(1), 212(2), and 212(3) configured to detect relative depths of surfaces within the local environment. In one example, depth detection sensors 212(1)-(3) may represent infrared cameras that capture reflections of light to determine a distance between wearable apparatus 102 and objects within the local environment (e.g., as part of a time-of-flight depth detection subsystem). Additionally or alternatively, one or more of depth detection sensors 212(1)-(3) may represent the image camera of machine-perception subsystem 104. In this embodiment, depth detection sensors 212(1)-(3) may capture visible-spectrum light and detect the distance of objects based on the captured light.

In one example, experience-analysis subsystem 202 may include a biometric sensor 214 that outputs biometric data about the user. The term "biometric data," as used herein, generally refers to information that describes and/or identifies an individual. Examples of biometric data may include, without limitation, a facial characteristic, a fingerprint, a voice command, an ocular pattern, a palm print, a scent, DNA, a behavior pattern, a heart rate, a body temperature, variations or combinations of one or more of the same, and/or any other form of physiological or behavioral characteristics. In this example, biometric sensor 214 may detect the biometric data and transmit the biometric data to experience-analysis subsystem 202 to be analyzed. For example, biometric sensor 214 may detect a heart rate and perform eye-tracking of the user's eyes to determine a user's emotional state.

In some embodiments, experience-analysis subsystem 202 may include an inertial-measurement unit 216 that detects an orientation and/or a movement of wearable apparatus 102. In these embodiments, inertial-measurement unit 216 may represent localization device 210 and/or a separate device used to detect movement.

Figure 3:
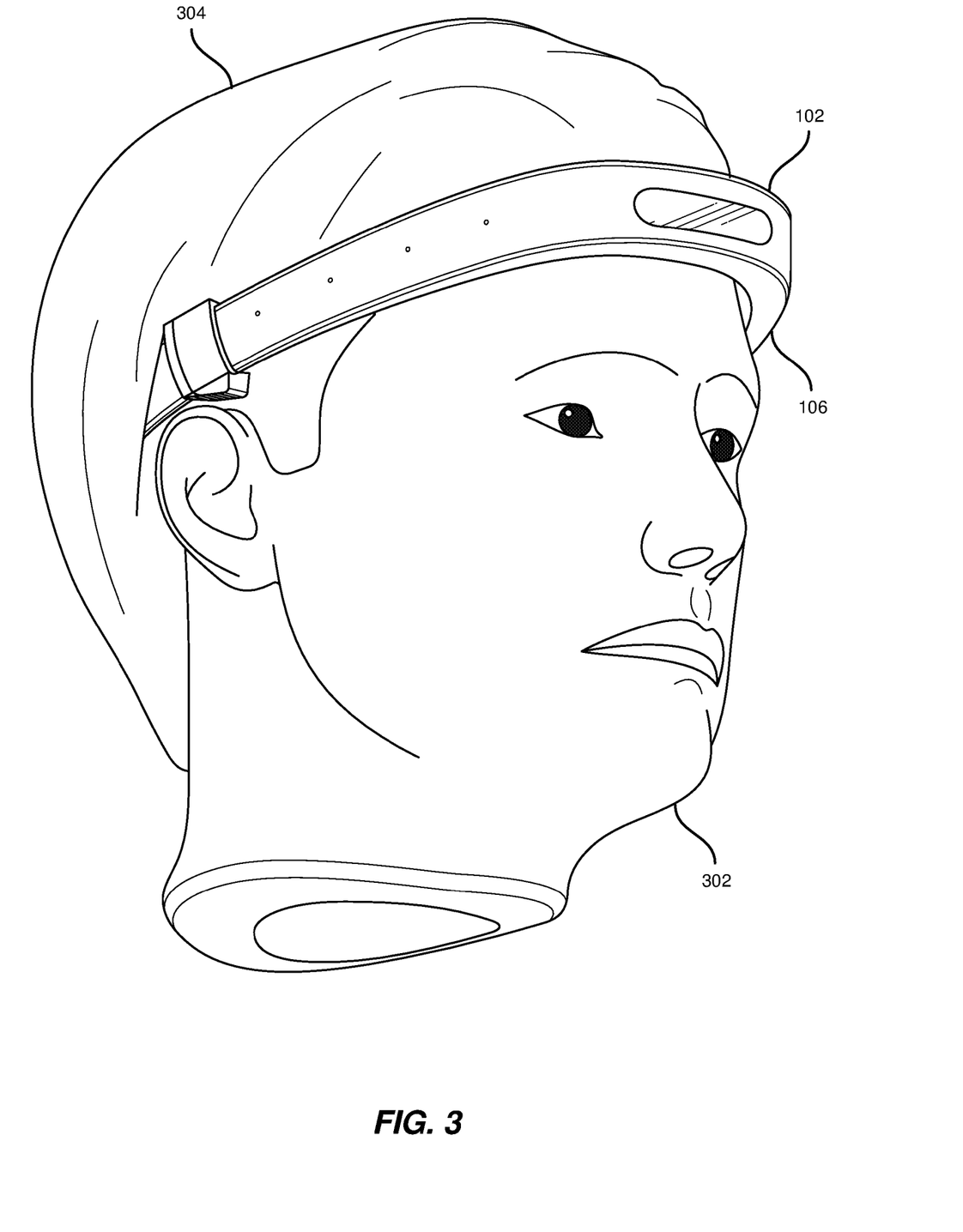
FIG. 3 is a perspective view of a user wearing the exemplary augmented reality system according to some embodiments.

FIG. 3 illustrates a perspective view of a user 302 wearing wearable apparatus 102. As shown in FIG. 3, wearable apparatus 102 may be dimensioned to be worn by user 302 about an axial region of a body of user 302 such that, when wearable apparatus 102 is worn by user 302, a field of view of user 302 into the local environment is substantially free of a view of wearable apparatus 102. The term "axial region," as used herein, generally refers to an anatomical region encompassing the head and torso of a human being. Additionally or alternatively, the axial region may include any portion along the long axis of a human body. In the example of FIG. 3, wearable apparatus 102 may include housing 106 dimensioned to be worn around a head 304 of user 302. Additionally or alternatively, housing 106 may be dimensioned to be worn around a neck of user 302.

In some embodiments, the field of view of user 302 may be free of the view of wearable apparatus 102 by a predetermined percentage. For example, user 302 may have a field of view that is 90% free of wearable apparatus 102. As shown in FIG. 3, wearable apparatus 102 may have no visible display that obstructs the field of view of user 302. In other embodiments, wearable apparatus 102 may include an unobtrusive display that permits user 302 to view an environment around user 302 without substantial obstruction, such as by incorporating a transparent display or a small display only visible at the peripheral of the field of view of user 302.

Figure 4A:
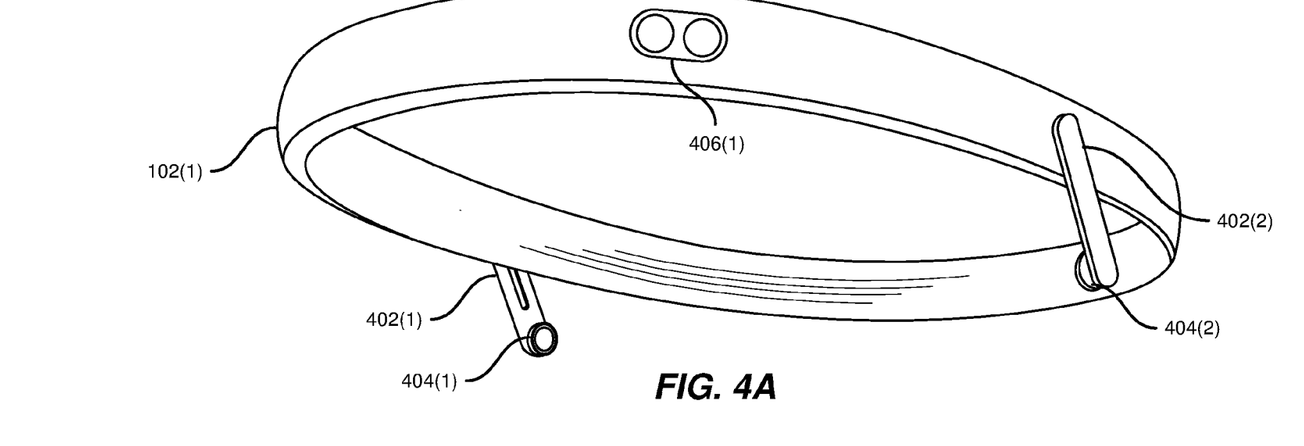
FIGS. 4A and 4B are perspective views of alternative head-worn apparatuses according to some embodiments.
Figure 4B:
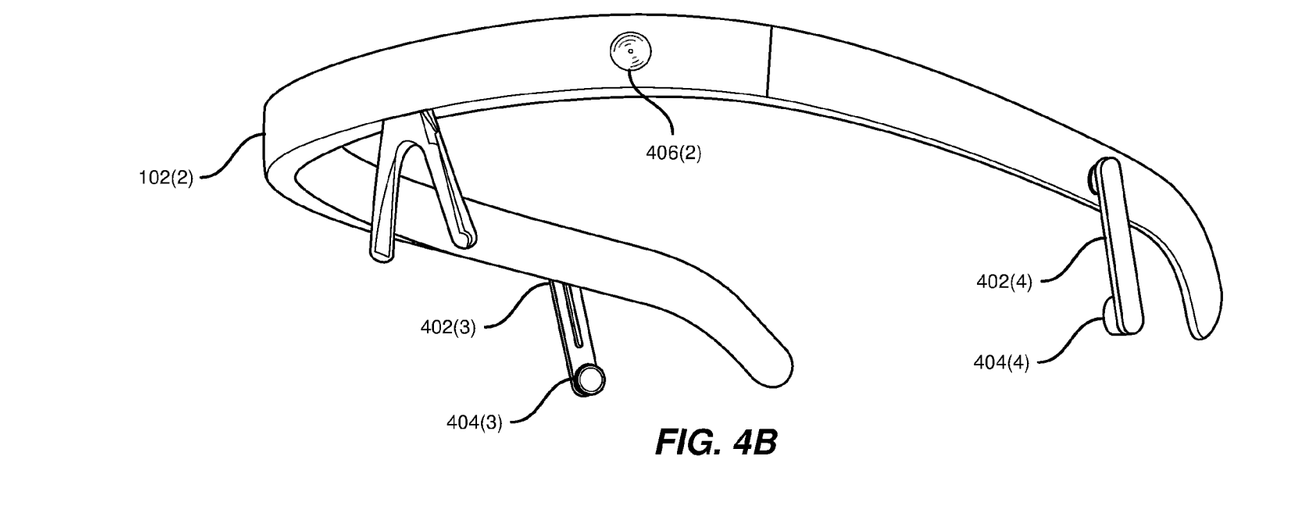

FIGS. 4A and 4B illustrate perspective views of alternative head-worn apparatuses. As shown in FIG. 4A, a wearable apparatus 102(1) may represent a headband that includes non-visual communication subsystems 402(1) and 402(2) that are coupled to the housing and that output contextual information about the experience of user 302 of FIG. 3. As shown in FIG. 4B, a wearable apparatus 102(2) may represent a glasses frame that includes similar non-visual communication subsystems 402(3) and 402(4). In this example, wearable apparatus 102(2) may not include a visual display, such as visual displays used in virtual reality glasses. Additional wearable apparatuses may include hats, belts, neckbands, necklaces, chestbands, eyewear frames, hairbands, and/or any other suitable wearable form that user 302 may wear about the axial region. Other embodiments of wearable apparatuses may be partially worn about the axial region without fully circumscribing the user, such as in the example of wearable apparatus 102(2).

In one embodiment, non-visual communication subsystems 402(1)-(4) may each include an output transducer, such as corresponding output transducers 404(1), 404(2), 404(3), and 404(4), configured to generate sound waves. An output transducer may convert an electrical signal to a vibration and/or a sound wave to produce audible sound. In some embodiments, non-visual communication subsystems 402(1)-(4) may include a network interface that sends the contextual information to a remote computing device, such as an additional wearable device or a cloud-based computing system. In this example, wearable apparatus 102(1) and/or 102(2) may include wireless communication capabilities to connect to additional computing systems. Additionally or alternatively, non-visual communication subsystems 402 (1)-(4) may include haptic feedback systems, network adapters, processors, memory devices, and/or any other component that may provide the contextual information to user 302. For example, wearable apparatus 102 of FIG. 3 may provide a directional vibration against the forehead of user 302 to indicate an object of interest in a particular direction.

In some examples, machine-perception subsystem 104 of FIG. 2 may include one or more image cameras that capture visible-spectrum light. In the examples of FIGS. 4A and 4B, image cameras 406(1) and 406(2) may capture visual information surrounding user 302 of FIG. 3 as user 302 navigates the local environment.

In some embodiments, all or a portion of machine-perception subsystem 104, experience-analysis subsystem 202, and/or non-visual communication subsystems 402(1)-(4) may represent separate devices or systems communicatively connected to a wearable apparatus by wired or wireless means. In alternate embodiments, machine-perception subsystem 104, experience-analysis subsystem 202, and/or non-visual communication subsystems 402(1)-(4) may be housed by a wearable apparatus, such as by housing 106 of FIG. 2, and integrated into a single form factor.

Figure 5:
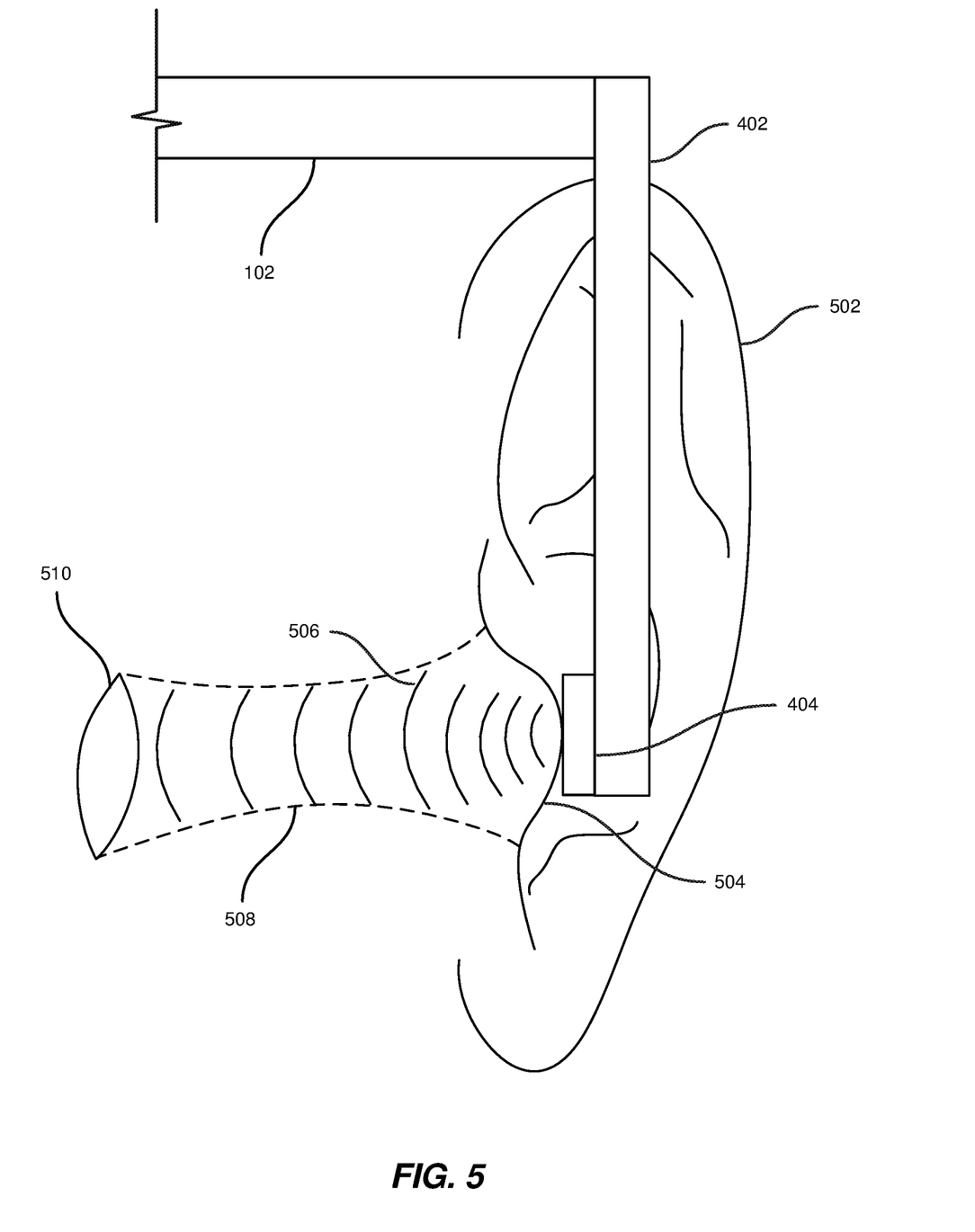
FIG. 5 is a front view of an exemplary output transducer vibrating a tragus of an exemplary ear according to some embodiments.

FIG. 5 illustrates a front view of an exemplary output transducer 404 of a non-visual communication subsystem 402 vibrating a tragus 504 of an exemplary ear 502. As shown in FIG. 5, output transducer 404 may be positionable against tragus 504 of ear 502 to mechanically vibrate tragus 504 to produce one or more sound waves, such as a sound wave 506, that travel down an ear canal 508 of ear 502 toward an eardrum 510. In some embodiments, the term "tragus" generally refers to a cartilage-based protrusion of an external ear that lies close to and in front of an ear canal and protrudes backward to partially cover the opening of the ear canal. As sound wave 506 hits eardrum 510, eardrum 510 may vibrate to create a sensation of sound for user 302 of FIG. 3. In some embodiments, output transducer 404 may convert an electrical signal to a vibration such that tragus 504 acts as a speaker cone for output transducer 404. Additionally or alternatively, output transducer 404 may utilize air conduction to direct sound wave 506 toward eardrum 510. In these embodiments, output transducer 404 may be positioned to avoid blocking ear canal 508, which may permit user 302 to hear ambient sounds from the local environment.

Figure 6:
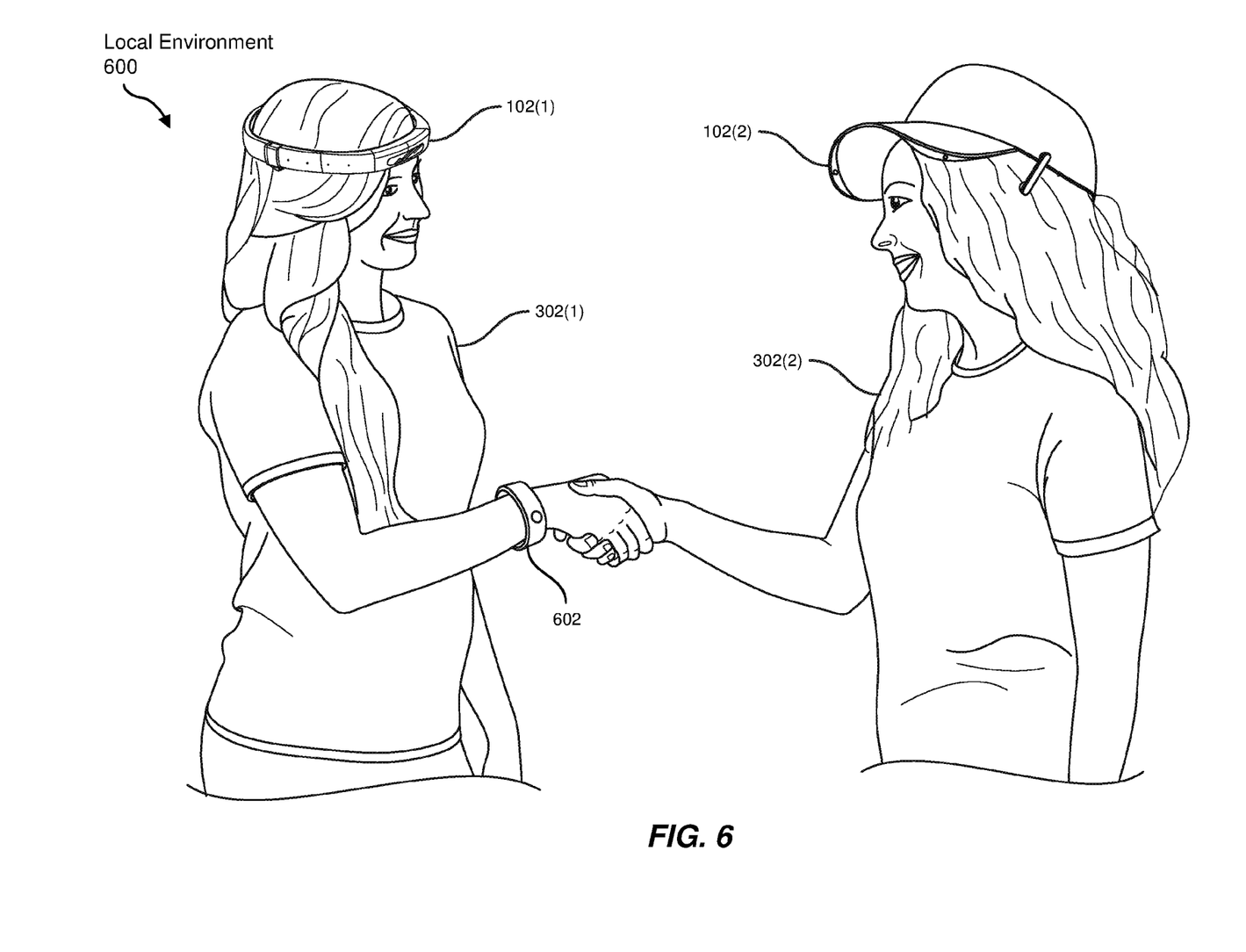
FIG. 6 is a perspective view of a user interacting with a local environment using the exemplary augmented reality system according to some embodiments.

FIG. 6 illustrates a perspective view of a user 302(1) interacting with a local environment 600 using a wearable apparatus 102(1). As shown in FIG. 6, user 302(1) may interact with a second user 302(2) wearing a wearable apparatus 102(2). In this example, machine-perception subsystem 104 may gather information about local environment 600 by observing user 302(2). Additionally, experience-analysis subsystem 202 of FIG. 2 may infer, based on the information about local environment 600 and information about user 302(1), contextual information about an experience of user 302(1) in local environment 600.

In one embodiment, experience-analysis subsystem 202 may infer the contextual information by identifying, within local environment 600, an object associated with the interest of user 302(1). In the example of FIG. 6, the object may include user 302(2), a location of user 302(1), and/or other contextual information captured by machine-perception subsystem 104 of wearable apparatus 102(1). In this example, experience-analysis subsystem 202 may utilize facial recognition to identify user 302(2). In other embodiments, wearable apparatus 102(1) may detect wearable apparatus 102(2), which may provide information about user 302(2) to experience-analysis subsystem 202.

In one example, experience-analysis subsystem 202 may infer the contextual information by determining that user 302(1) is currently interacting with an entity, such as user 302(2), and may use information about a previous interaction between user 302(1) and user 302(2) to identify information about user 302(2) to provide to user 302(1). In the example of FIG. 6, experience-analysis subsystem 202 may infer that user 302(1) is meeting a friend (e.g., user 302(2)) and may determine contextual information about the meeting based on a calendar schedule of user 302(1) and/or a previous meeting with user 302(2). Subsequently, a non-visual communication subsystem, such as non-visual communication subsystem 402 of FIG. 5, may output the contextual information about the experience of user 302(1), such as by generating audio feedback about user 302(2) to provide the name of and/or a history of interaction with user 302(2). Furthermore, non-visual communication subsystem 402 may output the contextual information without impeding the interaction between user 302(1) and user 302(2).

In the example of FIG. 6, user 302(1) may wear an additional wearable apparatus 602 that may include experience-analysis subsystem 202 of FIG. 2 and/or additional feedback systems, such as a visual screen. In the example of FIG. 6, additional wearable apparatus 602 may represent a bracelet that tracks hand motions of user 302(1). In this example, additional wearable apparatus 602 may be connected to wearable apparatus 102(1) via wired or wireless methods. Furthermore, additional wearable apparatus 602 may synchronize with wearable apparatus 102(1) to update spatial and/or temporal data.

As shown in FIG. 6, wearable apparatus 102(1) may be directly worn by user 302(1). Alternatively, wearable apparatus 102(2) may be connected to or integrated into an object, such as a hat, that may be worn by user 302(2). In additional embodiments, wearable apparatus 102(1) and/or 102(2) may be partially integrated into or held by a wearable object. For example, some functions of wearable apparatus 102(1) may be integrated into wearable apparatus 102(1) while other functions may be integrated into additional wearable apparatus 602 to jointly operate with wearable apparatus 102(1).

Figure 7:
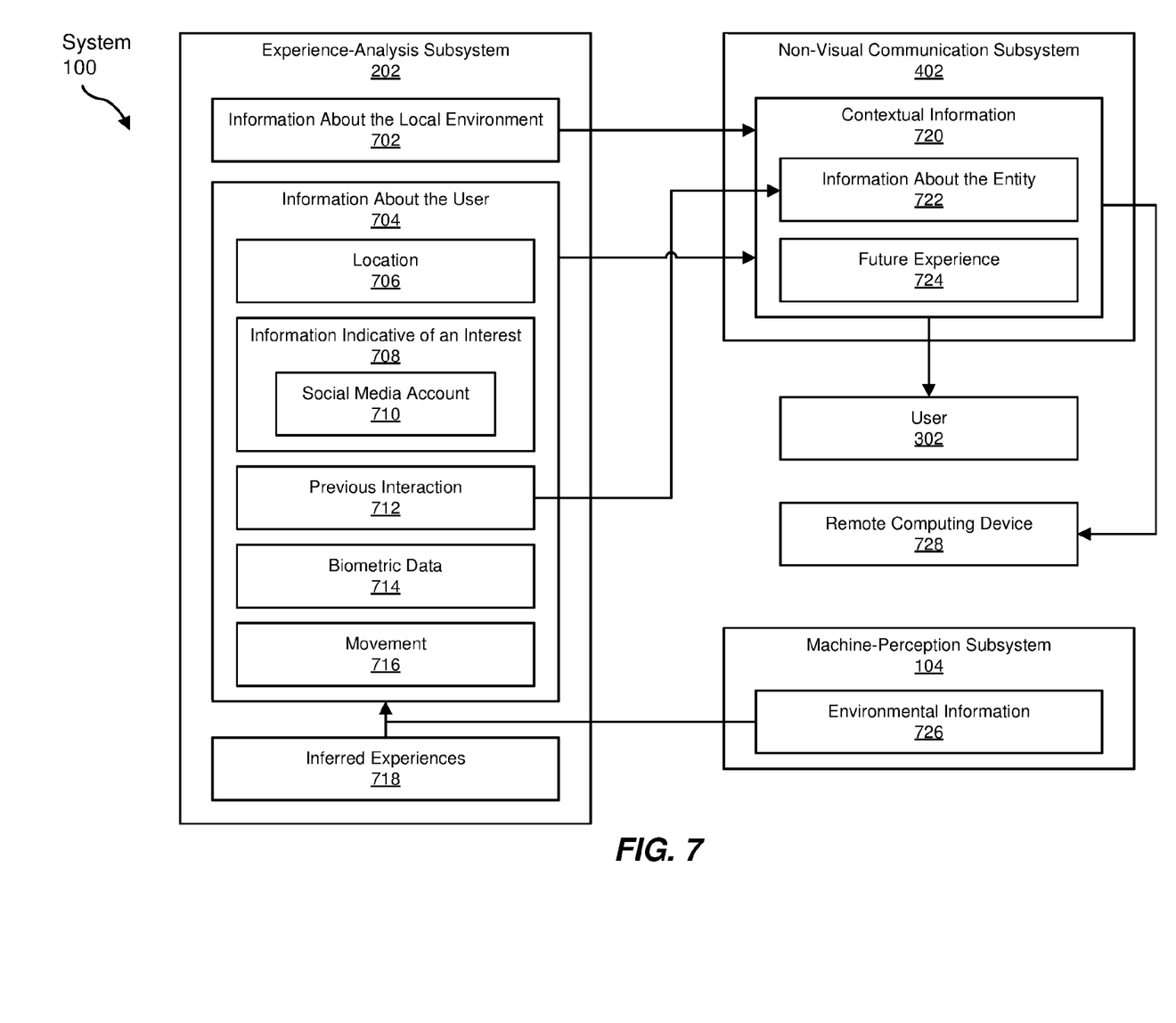
FIG. 7 is a block diagram of the exemplary augmented reality system according to some embodiments.

FIG. 7 illustrates a block diagram of exemplary augmented reality system 100. As shown in FIG. 7, machine-perception subsystem 104 may gather information about the local environment 702, including environmental information 726, and may send information about the local environment 702 to experience-analysis subsystem 202. Experience-analysis subsystem 202 may then infer, based on information about the local environment 702 and information about the user 704, contextual information 720. Furthermore, non-visual communication subsystem 402 may output contextual information 720, such as by communicating contextual information 720 to user 302 and/or transmitting contextual information 720 to a remote computing device 728 via a network interface.

In some embodiments, information about the user 704 may include a location 706 of wearable apparatus 102 in FIG. 6. Additionally or alternatively, information about the user 704 may include information indicative of an interest 708 of user 302. In these embodiments, experience-analysis subsystem 202 may infer contextual information 720 about the experience of user 302 by identifying, within local environment 600 of FIG. 6, an object associated with the interest of the user, such as user 302(2) associated with the interest of user 302(1) in FIG. 6.

Furthermore, in the above embodiments, information indicative of the interest 708 may include information maintained within a social media account 710 of user 302. The term "social media," as used herein, generally refers to a website, a platform, and/or an application used for social networking and/or to share digital content.

In additional embodiments, information about the user 704 may include information about a previous interaction 712 between user 302 and the entity. In these embodiments, experience-analysis subsystem 202 may infer contextual information 720 by determining, based on information about the local environment 702, that user 302 is currently interacting with the entity. Furthermore, experience-analysis subsystem 202 may use information about previous interaction 712 to identify information about the entity 722 to provide to user 302 as part of contextual information 720.

In one embodiment, experience-analysis subsystem 202 may include a biometric sensor, such as biometric sensor 214 of FIG. 2, that detects information about the user 704, which may include biometric data 714. In this embodiment, experience-analysis subsystem 202 may infer contextual information 720 by correlating an object in local environment 600 of FIG. 6 with biometric data 714 about user 302.

In some embodiments, experience-analysis subsystem 202 may include an inertial-measurement unit, such as inertial-measurement unit 216 of FIG. 2. In these embodiments, information about the user 704 may include a movement 716 of user 302 detected by inertial-measurement unit 216.

Additional examples of information about the user 704 may include, without limitation, a physical state of user 302, other users within a proximity of user 302, a calendar of user 302, a history of user 302, and/or any other relevant information that may be detected by machine-perception subsystem 104 and/or experience-analysis subsystem 202.

In some examples, experience-analysis subsystem 202 may correlate environmental information 726 detected by machine-perception subsystem 104 with inferred experiences 718 of user 302. In these examples, environmental information 726 may include information about the local environment 702, and inferred experiences 718 may include previous interactions between user 302 and the entity. Additionally, experience-analysis subsystem 202 may track, over a period of time, correlations between environmental information 726 and inferred experiences 718. Furthermore, information about the user 704 may include the correlations between environmental information 726 and inferred experiences 718.

In some embodiments, experience-analysis subsystem 202 may infer contextual information 720 to predict a future experience 724 of user 302. In these embodiments, experience-analysis subsystem 202 may use historical correlations between environmental information 726 and inferred experiences 718, historical information about the user 704, and/or other past information to predict a future interaction between user 302 and an entity. For example, experience-analysis subsystem 202 may identify a geographical area that user 302 previously visited, determine that user 302 historically visits the geographical area to eat at a particular restaurant, and then predict that user 302 may be visiting the restaurant when detecting location 706 to be the same geographical area. Subsequently, non-visual communication subsystem 402 may, as part of contextual information 720, preemptively provide a restaurant menu to user 302. In these embodiments, experience-analysis subsystem 202 may improve predictions of future experience 724 with more data collected over time as user 302 continues to use wearable apparatus 102 of FIG. 3.

Figure 8:
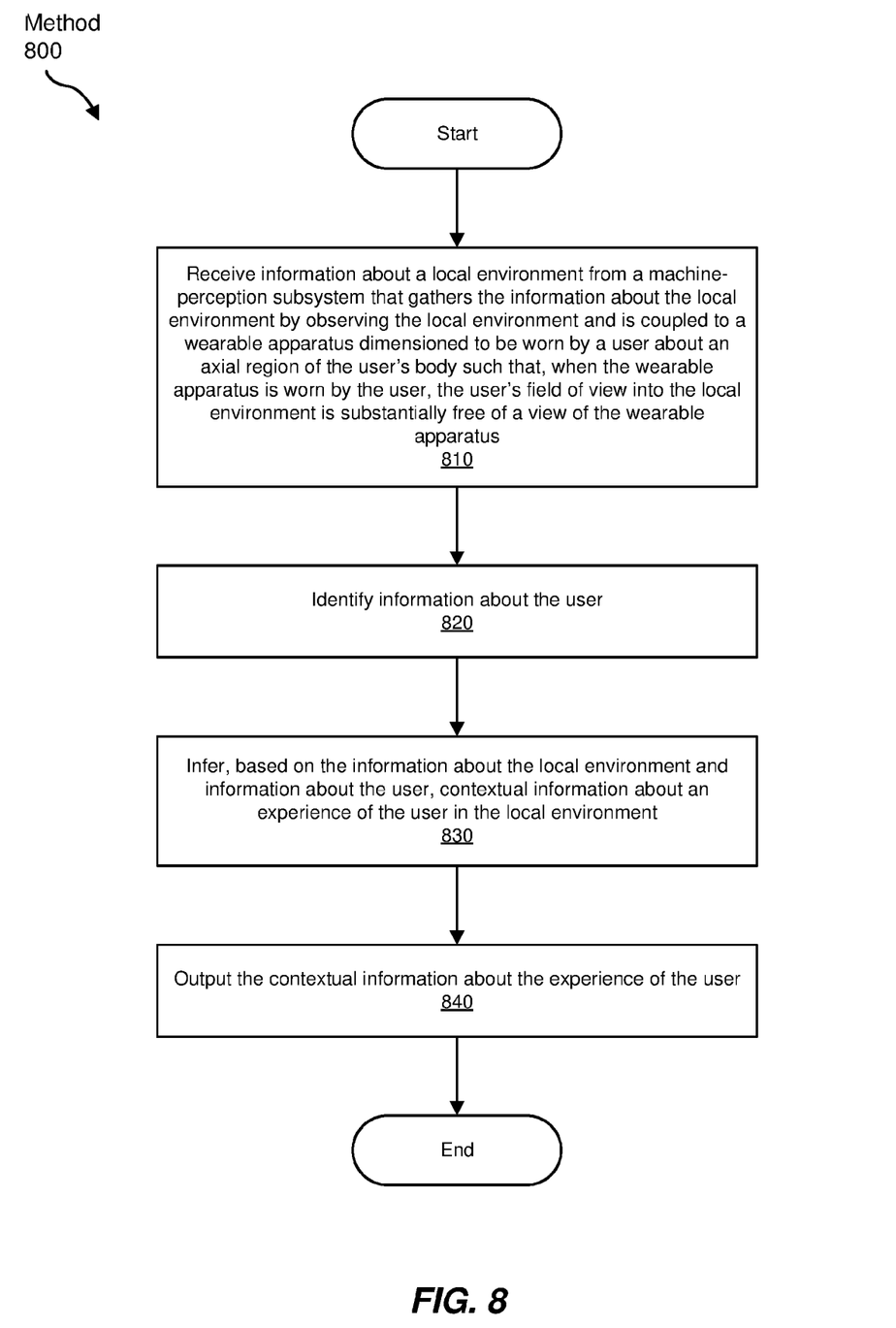
FIG. 8 is a flow diagram of an exemplary method for improving machine perception in augmented reality systems according to some embodiments.

FIG. 8 shows a flow diagram of an exemplary computer-implemented method 800 for improving machine perception in augmented reality systems. The steps shown in FIG. 8 may be performed by any suitable type or form of manual and/or automated apparatus and/or by any suitable computing system, including system 100 and/or wearable apparatus 102 illustrated in FIGS. 1-7. In one example, each of the steps shown in FIG. 8 may represent an algorithm whose structure includes and/or is represented by multiple sub-steps, examples of which will be provided in greater detail below.

As shown in FIG. 8, at step 810, one or more of the systems described herein may receive information about a local environment from a machine-perception subsystem that gathers the information about the local environment by observing the local environment and that is coupled to a wearable apparatus dimensioned to be worn by a user about an axial region of the user's body such that, when the wearable apparatus is worn by the user, the user's field of view into the local environment is substantially free of a view of the wearable apparatus. For example, wearable apparatus 102(1) illustrated in FIG. 6 may receive information about local environment 600 from machine-perception subsystem 104 of FIG. 2. In this example, wearable apparatus 102(1) may be dimensioned to be worn by user 302(1) without obstructing a field of view of user 302(1).

The systems described herein may perform step 810 in FIG. 8 in a variety of ways. In some examples, receiving information about local environment 600 may include mapping local environment 600. In these examples, system 100 of FIG. 7 may include detecting information about the local environment 702 and/or environmental information 726 to recreate a digital map of local environment 600. For examples, the digital map of local environment 600 may include a three-dimensional room layout and/or a building layout. Additionally or alternatively, system 100 may detect one or more entities, such as user 302(2) of FIG. 6, within local environment 600.

At step 820, one or more of the systems described herein may identify information about the user. For example, experience-analysis subsystem 202 of FIG. 7 may identify information about the user 704 based on detected information and/or information received from machine-perception subsystem 104.

The systems described herein may perform step 820 in FIG. 8 in a variety of ways. In some embodiments, identifying information about the user 704 may include receiving, from an additional wearable apparatus such as additional wearable apparatus 602 of FIG. 6, information detected by additional wearable apparatus 602. In these embodiments, wearable apparatus 102(1) of FIG. 6 may integrate with other devices and/or applications such as additional wearable apparatus 602. For example, wearable apparatus 102(1) may sync with a calendar on a mobile device and provide information on a meeting time to user 302(1). As another example, additional wearable apparatus 602 may track fitness information about user 302(1), and wearable apparatus 102(1) may receive information about a distance walked by user 302(1) from additional wearable apparatus 602. Additionally or alternatively, system 100 of FIG. 7 may identify information about the user 704 based on information detected by wearable apparatus 102(1) of FIG. 6.

At step 830, one or more of the systems described herein may infer, based on the information about the local environment and information about the user, contextual information about an experience of the user in the local environment. For example, as shown in FIG. 7, experience-analysis subsystem 202 may infer contextual information 720 based on information about the local environment 702 and information about the user 704.

The systems described herein may perform step 830 in FIG. 8 in a variety of ways. In one example, experience-analysis subsystem 202 may correlate information about the local environment 702 received from machine-perception subsystem 104 with information about the user 704 determined from historical data to deduce contextual information 720 about a current state and/or experience of user 302. Additionally or alternatively, inferring contextual information 720 may include predicting future experience 724 of user 302. For example, experience-analysis subsystem 202 may track and/or analyze past actions of user 302, provide a present analysis of the current state of user 302, and/or predict future experience 724 based on the past actions of user 302. As a specific example, experience-analysis subsystem 202 may automate memo-taking and/or task-creation in a schedule based on the current experience of user 302 and similar previous experiences.

At step 840, one or more of the systems described herein may output the contextual information about the experience of the user. For example, as illustrated in FIG. 7, non-visual communication subsystem 402 may output contextual information 720 to user 302 and/or transmit contextual information 720 to remote computing device 728.

The systems described herein may perform step 840 in FIG. 8 in a variety of ways. In one embodiment, non-visual communication subsystem 402, as part of wearable apparatus 102 in FIG. 1, may provide audio feedback to user 302 about contextual information 720. Additionally or alternatively, remote computing device 728 may represent a separate device with a visual feedback system that provides user 302 visual information without obstructing a view of local environment 600 in FIG. 6. In this embodiment, remote computing device 728 may include additional wearable apparatus 602 of FIG. 6 and/or any other device capable of analyzing or displaying contextual information 720. Furthermore, wearable apparatus 102 may provide real-time information to user 302 in a manner to filter and/or simplify analyses and/or actions that user 302 may take based on the information.

As discussed throughout the instant disclosure, the disclosed methods, systems, and apparatuses may provide one or more advantages over traditional method for machine perception in augmented reality systems. For example, by incorporating cameras, sensors, microphones, and/or other devices, a wearable apparatus may capture and evaluate a local environment around a user and/or data about the user. An augmented reality system may also incorporate computing capabilities to analyze the environment, data storage to store historical data, a battery to enable mobility of the wearable apparatus, and/or feedback systems to provide information about the environment to the user. These components may then be contained within a portable, wearable apparatus with a smaller and/or lighter form factor than traditional augmented reality apparatuses.

The disclosed systems may further improve artificial intelligence by incorporating context-aware applications and environmental and/or user data to increase the accuracy of machine perception for artificial intelligence assistance. For example, the disclosed systems may improve the development of artificial intelligence assistants by accounting for location, nearby users, past history, and/or other relevant information that may improve selection of information to present to the user and/or predictions of user interactions. By increasing the amount of time the user continues to wear the wearable apparatus, the systems described herein may improve the granularity, fidelity, and/or persistence of detected user and/or environmental data.

The wearable apparatus may also improve portability by using a less intrusive, more lightweight form factor, in comparison to traditional apparatuses, that enable the user to wear the wearable apparatus for longer periods of time. This, in turn, may improve the ability of the disclosed systems to minimize friction in using the wearable apparatus, which may lower barriers to using the apparatus in public spaces and improve analyses of the environment over time. Additionally, the wearable apparatus may improve over traditional apparatuses by eliminating an obstructive visual display. For example, the lack of a visual display obscuring the user's eyes may improve social interactions by avoiding interference due to obscuring the user's expressions during the interactions. The disclosed systems may also improve the utility of augmented reality systems by improving ways to enhance human perception, memory, and/or cognition. For example, by providing enough comfort to be worn all day, the wearable apparatus may enable a user to engage in more social interactions which may, in turn, improve feedback to the user. Thus, the methods, systems, and apparatuses described herein may improve the detection and analysis of a user's environment for augmented reality uses.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a wearable apparatus comprising a housing dimensioned to encircle the head of a user about the long axis of the user when worn and configured such that, when the wearable apparatus is worn by the user,
   a field of view of the user into a local environment is free of a view of the wearable apparatus;
   a machine-perception subsystem that is integrated into a single form factor with the housing, the machine-perception subsystem comprising at least two input transducers attached at opposite sides of the wearable apparatus, the machine-perception subsystem configured to:
      receive at least one sound emitted by at least one element;
      identify a direction of the received at least one sound; and
      detect, based on the identified direction of the at least one sound, that the at least one element is located within the local environment;
   an experience-analysis subsystem, integrated into the single form factor with the housing and that infers, based on the detected at least one element in the local environment and information about the user, contextual information about an experience of the user in the local environment; and
   a non-visual communication subsystem that outputs the contextual information about the experience of the user, the non-visual communication subsystem being integrated into the single form factor with the housing of the wearable apparatus and comprising at least one output transducer, positionable such that the non-visual communication subsystem holds the at least one output transducer in a position that directs sound towards the user's ear.

2. The system of claim 1, wherein the at least one output transducer is positionable against a tragus of a user's ear to mechanically vibrate the tragus to produce the sound waves.

3. The system of claim 1, wherein:
   the machine-perception subsystem comprises an image camera that captures visible-spectrum light from the local environment;
   the experience-analysis subsystem comprises a localization device for determining a location of the wearable apparatus; and
   the information about the user comprises the location of the wearable apparatus.

4. The system of claim 3, wherein the localization device comprises at least one of:
   a localization camera that captures image data for determining a relative position of the wearable apparatus within the local environment; or
   a localization sensor that determines a geographic location of the wearable apparatus.

5. The system of claim 1, wherein the machine-perception subsystem comprises a depth detection sensor configured to detect relative depths of surfaces within the local environment.

6. The system of claim 1, wherein the non-visual communication subsystem comprises a network interface that sends the contextual information to a remote computing device.

7. The system of claim 1, wherein:
the information about the user comprises information indicative of an interest of the user; and
the experience-analysis subsystem infers the contextual information about the experience of the user by identifying, within the local environment, an object associated with the interest of the user.

8. The system of claim 7, wherein the information indicative of the interest of the user comprises information maintained within a social media account of the user.

9. The system of claim 1, wherein:
the information about the user comprises information about a previous interaction between the user and an entity; and
the experience-analysis subsystem infers the contextual information about the experience of the user by:
determining, based on the received at least one sound emitted by the at least one element, that the user is currently interacting with the entity; and
using the information about the previous interaction between the user and the entity to identify information about the entity to provide to the user.

10. The system of claim 1, wherein:
the experience-analysis subsystem comprises a biometric sensor that outputs biometric data about the user;
the information about the user comprises the biometric data; and
the experience-analysis subsystem infers the contextual information about the user by correlating an object in the local environment with the biometric data about the user.

11. The system of claim 1, wherein:
the experience-analysis subsystem:
correlates environmental information detected by the machine-perception subsystem with inferred experiences of the user; and
tracks, over a period of time, correlations between the environmental information and the inferred experiences of the user; and
the information about the user comprises the correlations between the environmental information and the inferred experiences of the user.

12. The system of claim 1, wherein:
the experience-analysis subsystem comprises an inertial-measurement unit; and
the information about the user comprises movement of the user detected by the inertial-measurement unit.

13. The system of claim 1, wherein the non-visual communication subsystem is further configured to provide a directional vibration to the body of the user to indicate the identified direction of the received at least one sound emitted by the at least one element.

14. The system of claim 1, wherein the machine-perception subsystem is held by the housing and coupled to an inside portion of the wearable apparatus.

15. The system of claim 1, wherein the experience-analysis subsystem is located within the housing.

16. A method comprising:
receiving information about a local environment from a machine-perception subsystem that is integrated into a single form factor with a wearable apparatus comprising a housing dimensioned to encircle the head of a user about the long axis of the user when worn and configured such that, when the wearable apparatus is worn by the user,
a field of view of the user into a local environment is free of a view of the wearable apparatus, the machine-perception subsystem comprising at least two input transducers attached at opposite sides of the wearable apparatus, the machine-perception subsystem configured to:
receive at least one sound emitted by at least one element;
identify a direction of the received at least one sound; and
detect, based on the identified direction of the at least one sound, that the at least one element is located within the local environment;
identifying information about the user;
inferring, by an experience-analysis subsystem that is integrated into the single form factor with the housing and based on the detected at least one element in the local environment and the identified information about the user, contextual information about an experience of the user in the local environment; and
outputting the contextual information about the experience of the user via a non-visual communication subsystem that is integrated into the single form factor with the housing of the wearable apparatus and comprises at least one output transducer, positionable such that the non-visual communication subsystem holds the at least one output transducer in a position that directs sound towards the user's ear.

17. The method of claim 16, wherein receiving information about the local environment comprises mapping the local environment.

18. The method of claim 16, wherein identifying information about the user comprises receiving, from an additional wearable apparatus, information detected by the additional wearable apparatus.

19. The method of claim 16, wherein inferring contextual information about the experience of the user comprises predicting a future experience of the user.

20. A head-worn apparatus comprising:
a housing dimensioned to encircle the head of a user about the long axis of the user when worn and configured such that a field of view of the user into a local environment is free of a view of the wearable apparatus;
a machine-perception subsystem that integrated into a single form factor with the housing, and placed above eyes of the user when the head-worn apparatus is worn, the machine-perception subsystem comprising at least two input transducers attached at opposite sides of the head-worn apparatus, the machine-perception subsystem configured to:
receive at least one sound emitted by at least one element;
identify a direction of the received at least one sound; and
detect, based on the identified direction of the at least one sound, that the at least one element is located within a local environment;
an experience-analysis subsystem that is integrated into the single form factor with the housing and that infers, based on the at least one element in the local environment and information about the user, contextual information about an experience of the user in the local environment; and
a non-visual communication subsystem that is integrated into the single form factor with the housing and that outputs the contextual information about the experience of the user via at least one output transducer, positionable such that the non-visual communication subsystem holds the at least one output transducer in a position that directs sound waves towards the user's ear.

* * * * *